US008112626B1

(12) United States Patent
Adler et al.

(10) Patent No.: US 8,112,626 B1
(45) Date of Patent: Feb. 7, 2012

(54) METHOD AND APPARATUS TO PROVIDE PUBLIC KEY AUTHENTICATION WITH LOW COMPLEXITY DEVICES

(75) Inventors: Joseph A. Adler, Mountain View, CA (US); David M'Raihi, San Carlos, CA (US)

(73) Assignee: Symantec Corporation, Mountain View, CA (US)

( * ) Notice: Subject to any disclaimer, the term of this patent is extended or adjusted under 35 U.S.C. 154(b) by 938 days.

(21) Appl. No.: 11/336,255

(22) Filed: Jan. 20, 2006

(51) Int. Cl.
*H04L 9/00* (2006.01)
(52) U.S. Cl. .......................................... 713/168; 380/46
(58) Field of Classification Search .................. 713/153, 713/163, 183, 193, 340, 164, 150, 224, 201, 713/212, 213, 220, 223; 714/38, 49, 48, 714/35, 37; 709/203, 217, 223, 237, 225, 709/229, 227, 201, 220; 726/22, 14, 13, 726/11, 34, 25, 26, 27, 9, 28, 29; 380/42, 380/55, 58, 46; 345/581, 55
See application file for complete search history.

(56) References Cited

U.S. PATENT DOCUMENTS

| | | | | |
|---|---|---|---|---|
| 6,073,234 | A | * | 6/2000 | Kigo et al. ................. 713/161 |
| 6,178,377 | B1 | | 1/2001 | Ishihara et al. |
| 6,567,832 | B1 | * | 5/2003 | Ono et al. ................... 708/606 |
| 6,611,738 | B2 | | 8/2003 | Ruffner |
| 2002/0136401 | A1 | * | 9/2002 | Hoffstein et al. ............. 380/30 |
| 2004/0001590 | A1 | * | 1/2004 | Eisentraeger et al. ......... 380/30 |
| 2006/0174126 | A1 | * | 8/2006 | Crandall et al. ............. 713/176 |
| 2006/0291649 | A1 | * | 12/2006 | Crandall et al. ............... 380/46 |
| 2007/0174618 | A1 | * | 7/2007 | Nakano et al. ............... 713/171 |

OTHER PUBLICATIONS

Ari Juels, "Minimalist Cryptography for Low-Cost RFID Tags," RSA Laboratories, 29 pages.
Istvan Vajda, et al., "Lightweight Authentication Protocols for Low-Cost RFID Tags" Aug. 5, 2003, 10 pages.
Darrel Hankerson, et al., "Software Implementation of Elliptic Curve Cryptography Over Binary Fields," 24 pages.
Sanjay E. Sarma, et al., White Paper "RFID Systems, Security & Privacy Implications", Auto-ID Center, Massachusetts Institute of Technology, Cambridge, MA, USA, published Nov. 1, 2002, 17 pages.
Sanjay Sarma, White Paper "Towards the 50¢ Tag," Auto-ID Center, Massachusetts Institute of Technology, Cambridge, MA, USA, published Nov. 1, 2001, 19 pages.

(Continued)

*Primary Examiner* — Vivek Srivastava
*Assistant Examiner* — Nega Woldemariam
(74) *Attorney, Agent, or Firm* — Morris & Kamlay LLP

(57) ABSTRACT

A method and apparatus to authenticate limited processing-power systems (LPPS) using elliptic cryptography within a well known elliptic curve E, over a well known finite field F((E(F)). The apparatus comprises a random number generator to choose a random value b, of a similar order of magnitude to the order of E(F). The apparatus further comprises a challenge calculator to calculate a value C=bP and send the challenge to the LPPS, where P is a point on the elliptic curve E(F) which was used as a basis for generating a private key, a, for the LPPS. The apparatus further comprising an RFID reader to receive a challenge response, R=aC=abP from the LPPS, and a crypto calculator to calculate bQ, based on a public key, Q, of the LPPS. The apparatus further comprising a comparison logic to authenticate the LPPS if bQ=aC=abP.

23 Claims, 6 Drawing Sheets

OTHER PUBLICATIONS

Damith C. Ranasinghe, et al., "Los-Cost RFID Systems: Confronting Security and Privacy," 8 pages.

Tim Kerins, et al., "Fully Parameterizable Elliptic Curve Cryptography Processor over $GF(2^m)$" University College Cork, Cork City, Ireland, 10 pages.

Butler W. Lampson, "Computer Security in the Real World," Microsoft, 12 pages.

Mark Harrison, et al., "Autoidlabs-WP-Bizapps-014," Auto-ID Labs, Information management in the product lifecycle—The role of networked RFID. White Paper Series/Edition 1, copyright Sep. 2005, cover page and pp. 1-12.

Jonathan Lutz, et al., "High Performance Elliptic Curve Cryptographic Co-processor," (Pieces of this work were presented at SPE 2003 [19] and ITCC 2004 [20]), pp. 1-37.

* cited by examiner

All computations are performed within a well known elliptic curve $E$ over a well known finite field $\mathscr{F}_q$

METHOD AND APPARATUS TO PROVIDE PUBLIC KEY AUTHENTICATION WITH LOW COMPLEXITY DEVICES

FIELD OF THE INVENTION

The present invention relates to authentication, and more particularly to challenge-response based authentication.

BACKGROUND

The problems of authentication—proving that a product, computer, device, or person is who they say they are—were addressed theoretically in 1976 by Whitfield Diffie and Martin Hellman when they published their concepts for a method of exchanging secret messages without exchanging secret keys. The idea came to fruition in 1977 with the invention of the RSA Public Key Cryptosystem. The RSA Public Key Cryptosystem can be used for encrypting and authenticating, i.e. digitally signing, documents. The RSA system uses large prime numbers in the generation of the public/private keypair. While this functions quite well in large systems such as computers, for limited capability systems—for example RFID tags, smart cards, or other devices having either limited memory or limited computational capability—the RSA public key cryptography system cannot be used.

Radio-frequency identification (RFID) tags are becoming more common. They are being used for tracking products, and other objects. Some RFID tags may include an Electronic Product Code (EPC). FIG. 1 describes an exemplary EPC system.

When an RFID tag is manufactured with an EPC, the EPC is registered within the Electronic Product Code Information System (EPC-IS). The RFID tag is attached to a product and the EPC becomes a part of that product as it moves through the supply chain. The particular product information is added to the manufacturer's EPC-IS, and the knowledge that this data exists within the manufacturer's EPC-IS is passed to the EPC Discovery Service.

When the product leaves the manufacturer's facility, its departure is automatically registered with the EPC-IS. Likewise, when the product arrives at the next point in the supply chain (e.g., a distributor site) it is automatically read and registered with the distributor's EPC-IS and with the EPC Discovery Service.

When the distributor, retailer, or potentially final consumer needs product information, it uses a query application to query the manufacturer's EPC-IS. The query application uses the Object Name Service (ONS) to find the appropriate EPC-IS server. The query application contacts its local ONS server to find the appropriate EPC-IS server. If the local ONS server does not have the appropriate record in its cache, it will query the root ONS Server to find the location of the manufacturer's ONS Server, which in turn provides the location of the manufacturer's ONS server, and finally the appropriate EPC-IS server. This query process is transparent to the requester takes only milliseconds to execute. With the manufacturer's EPC-IS location, the distributor's application can request specific product information. As products progress through the supply chain, they are in constant communication with the EPC-IS. The result is real-time full visibility of the supply chain.

Many business applications rely on accurate information about products in the supply chain. For example, pharmaceutical manufacturers, distributors, and retailers need to protect consumers against counterfeit goods. Without a cryptographic mechanism, it is impossible to electronically validate that individual items are authentic. Therefore, an improved cryptographic mechanism that would be usable in low complexity systems such as RFID tags or smart cards would be useful.

SUMMARY OF THE INVENTION

A method and apparatus to authenticate limited processing-power systems (LPPS) using Elliptic Curve Cryptography within a well known elliptic curve E, over a well known finite field $F((E(F))$.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

The method and apparatus described is a zero knowledge proof system which is sufficiently light-weight for limited processing power applications. For example, the authentication system may be implemented on RFID tags. Note that although in the discussion below the client-side of the authentication (i.e. the authenticating device) is referred to as RFID tags, alternative limited-processing power systems may also utilize the techniques described herein. For example, smart cards, cellular telephones, handheld devices, watches, or other devices having either limited memory or limited computational capability limited processing power may use these techniques. For simplicity, such devices will be referred to as low processing power systems (LPPS). The present technique is described using computations performed within a well known elliptic curve E over a finite field, F. (This is referred to as E(F).) The field may be an extension field of any prime number. In one embodiment, the field is a binary field, such as $2^{163}$. In another embodiment, the finite field is a ternary field, such as $3^{107}$. Alternative field definitions may be used.

In one embodiment, a simple protocol is used to communicate with tags, similar to the Class 1 EPC Global protocol. In one embodiment, ECC-based public key authentication mechanisms will be used in the system.

In one embodiment, the key is precompiled into a function $f_{E,F,a}(P)=aP$ over $E(F)$. In one embodiment, the private key, a, the field F, and/or the elliptic curve E in the function $f_{E,F,a}(P)$ may be hard-wired into the logic of the computing device. Storing the logic needed to compute the function $f_{E,F,a}(P)$ for a pre-determined E, F, and/or a, instead of implementing a general purpose function $g(E, F, x, Y)=xY$ in hardware, may allow the manufacturer to reduce the number of logic gates required in the RFID tag.

Figure 1:
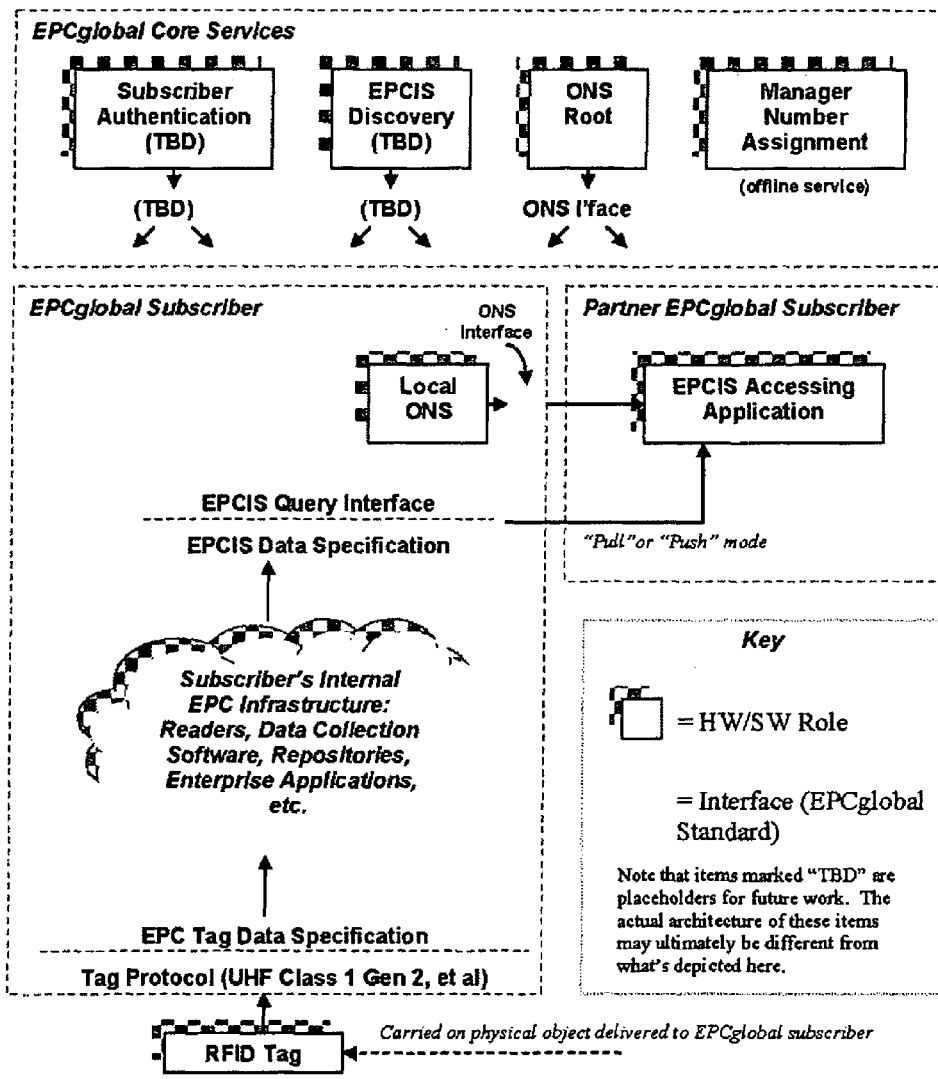
FIG. 1 is block diagram of the EPC service discovery, in accordance with the prior art.
Figure 2:
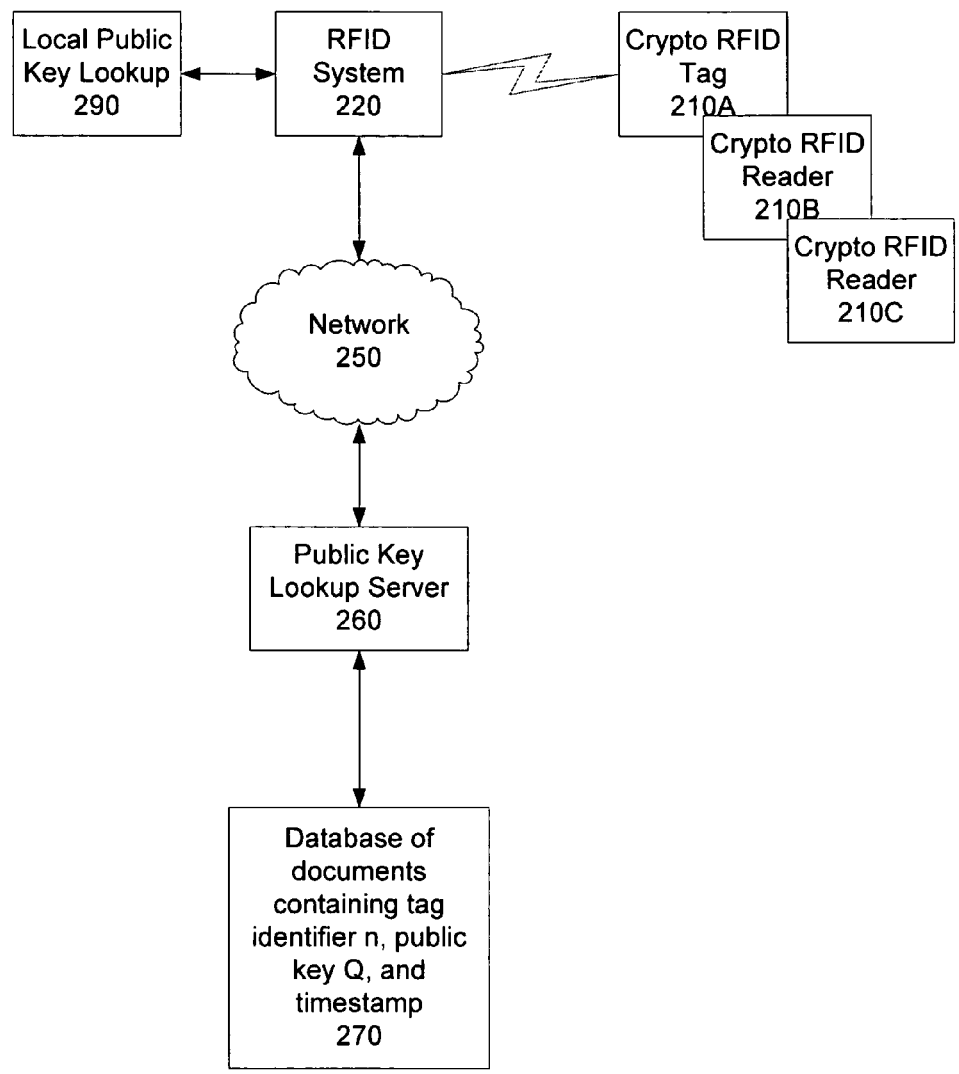
FIG. 2 is a network diagram of one embodiment of the components of the cryptographic service in accordance with the present invention.

FIG. 2 is a network diagram of one embodiment of the components of the cryptographic service in accordance with the present invention. The RFID system 220, in one embodiment, includes a reader to read one or more crypto-RFID tags 210A, 210B, 210C. In one embodiment, the RFID system 220 is capable of reading multiple RFID tags 210A-C simultaneously. In another embodiment, each tag is interrogated in turn.

In one embodiment, the RFID system 220 looks up a public key associated with a tag ID, received from an RFID tag. In one embodiment, the public key look-up may be local 290, or a remote system 260 accessible via network 250. In one embodiment, local public-key look-up 290 may be located on a server or system local to the RFID system 220. In one embodiment, the local public-key look-up 290 may be data sent with the RFID tagged items. For example, the local public-key look-up 290 may be a CD, flash memory, or other non-volatile memory. In another embodiment, the local public-key look-up 290 may be a part of RFID system 220, i.e. a built in non-volatile memory such as a flash memory. In another embodiment, the local public-key look-up 290 may be an insertable memory such as a SIM card, USB key, or similar device designed to be plugged into the RFID system 220. In another embodiment, the public key look-up may be part of the tag reader. That is, the RFID tag may include a digitally signed certificate, which contains the public key for the tag.

In one embodiment, public key look-up server 260 may be local to the RFID system 220. In one embodiment, public key look-up server 260 may be a private server that is not accessible to the public.

In one embodiment, the record associated with each RFID tag includes the tag identifier (tag ID), the tag public key Q, and a time stamp indicating when the RFID was created. This may be stored in a database 270 when the tag is created. Note that therefore, this data does not include the tag's private key, which is never stored outside the tag itself.

Figure 3:
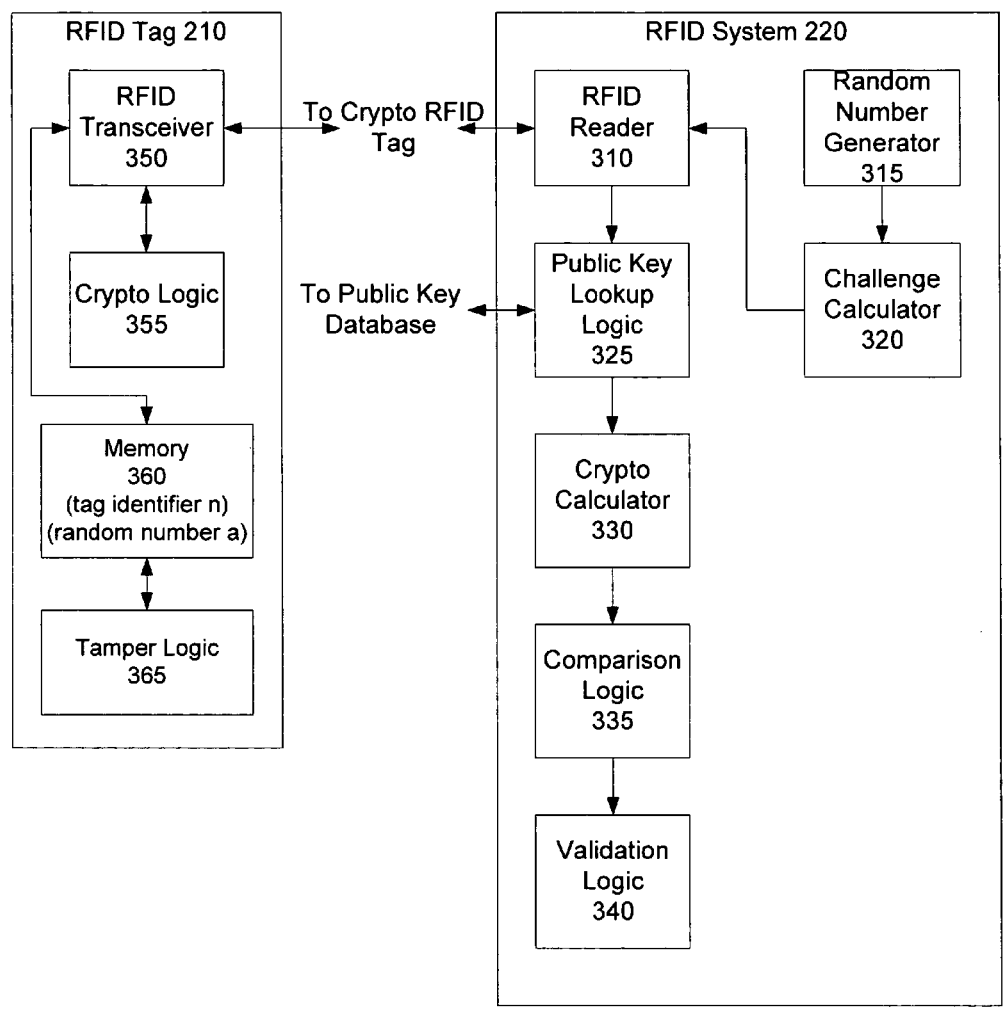
FIG. 3 is a block diagram of one embodiment of the server and client.

FIG. 3 is a block diagram of one embodiment of the RFID tag and RFID system. The RFID tag (alternatively referred to as low processing power system, LPPS) 210 includes a transceiver 350, or alternatively a separate receiving and transmitting logic. In one embodiment, the transceiver 350 is an RFID transceiver. In one embodiment, the LPPS 210 may be sufficiently low powered that the transceiver 350 is powered by the incoming signals received from system 220.

During initialization, crypto logic 355 calculates an initial private key, which is stored in memory 360. The private key is a value of the same length as the order of E(F), and is randomly generated. Crypto logic 355 further calculates a public key based on the initial private key. This public key, in one embodiment signed by a certification authority, is used for authenticating the LPPS 210. Memory 360 is used to store the tag identifier (received during initialization) and the private key (random number a). The number of gates required to store the private key and compute the authentication function is proportional to the length of the key. Therefore, minimizing key size, while ensuring security, is of interest. Therefore, in one embodiment, the system uses a ternary field as F, which enables the reduction of word size from 163 in a binary field to 107 in a ternary field, an approximately 35% reduction in word length without reducing the security of the system. This means that, by using ternary logic gates instead of binary logic gates, fewer logic gates would be required, and that some operations (such as multiplication) would be faster. In one embodiment, the system includes tamper logic 365. Tamper logic 365 provides tamper-resistance. In one embodiment, the entire tag is tamper resistant. In another embodiment, only the memory, or portion of memory storing the private key is tamper resistant. In one embodiment, tamper resistance may, include logic that erases the memory if the system detects an attempt to read the memory, hack the bus, etc. This may be implemented, in one embodiment, using fuses.

During use for authentication, crypto logic 355 receives a challenge, and calculates a response to the challenge. The response to the challenge is the challenge times the private key. The multiplication takes place on the selected elliptic curve over the selected finite field. As noted above, this field in one embodiment is a known binary field.

The RFID system 220 includes an RFID reader 310, which sends a challenge to the RFID tag 210. The challenge is generated by challenge calculator 320, based on a random number created by random number generator 315. The random number is a number of a similar order of magnitude to the order of E.

When the RFID tag 210 responds to the challenge, the response includes a tag ID as well as the challenge response. The public key lookup logic 325 uses the tag ID to look up the tag's public key in a database. As noted above the database may be part of the RFID system 220, local, or remote and accessible via a network.

The crypto calculator 330 takes the random number and using the public key calculates the public key value. The public key value should be equal to the challenge response returned by the RFID tag. Therefore, comparison logic 335 performs a comparison between the challenge response returned by the RFID tag 210, and the result of the calculation. If the values are identical, then the RFID system 220 certifies the RFID tag 210. In one embodiment, validation logic 340 outputs the proper information indicating that the RFID tag 210 has been validated. In one embodiment, the RFID system 220 has an output mechanism to indicate that the RFID tag 210 is valid.

Figure 4:
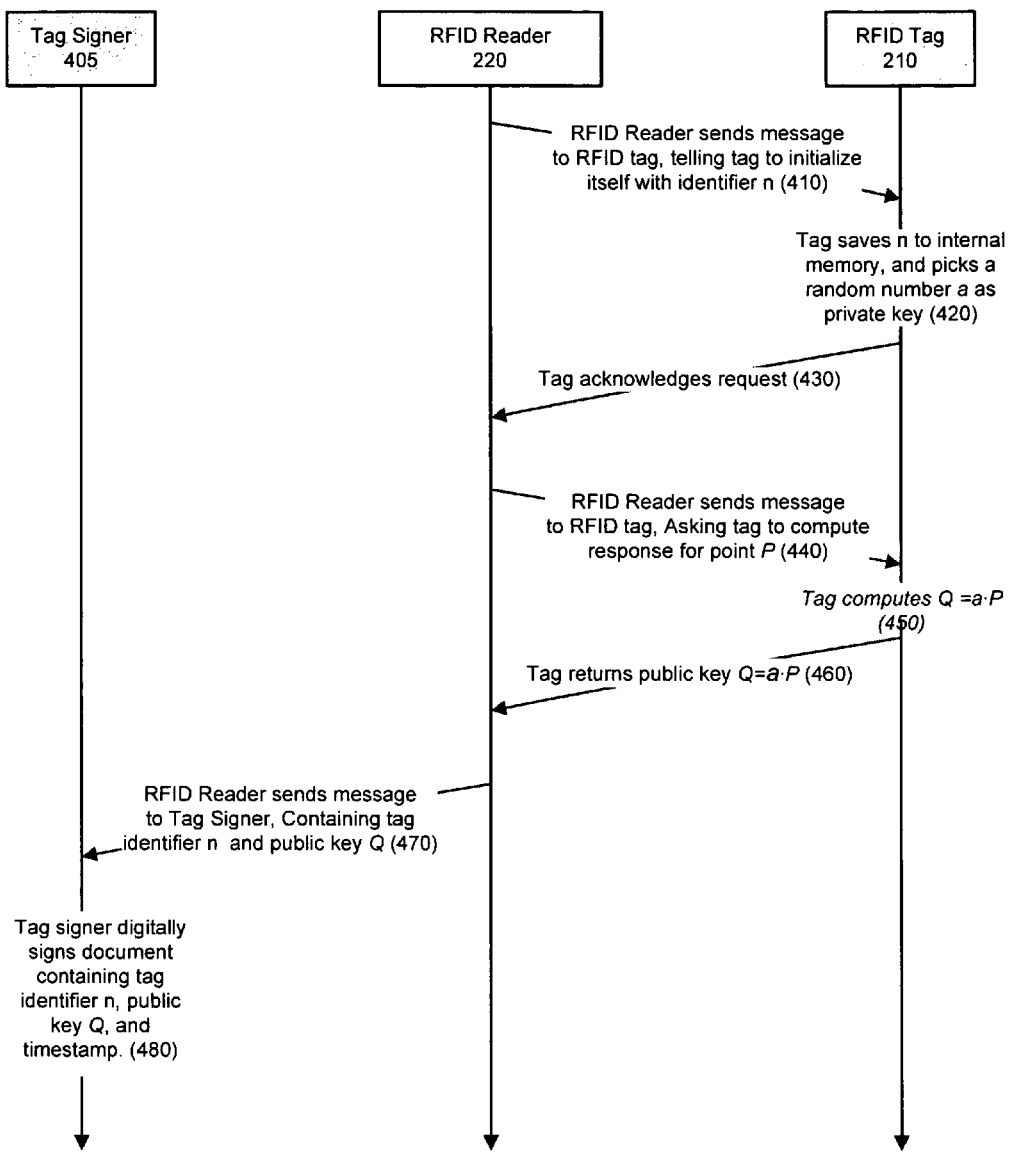
FIG. 4 is a signal flow diagram of one embodiment of generating an RFID tag in accordance with the present invention.

FIG. 4 is a signal flow diagram of one embodiment of generating an RFID tag in accordance with the present invention. The manufacturer chooses a finite field F and an elliptic curve E over F. In one embodiment, a standard field and curve are chosen for all tags so that any reader can easily query any tag. The manufacturer then chooses a point $P \in E(F)$ that is the "base" for a subgroup of E(F). The point P does not have to be a generator, but should have a large order, similar to the order of E(F).

The RFID reader 220 sends an initialization message 410 to the RFID tag 210. The initialization message 410, in one embodiment, includes a tag identifier. In one embodiment, the initialization message also includes a definition of field F and elliptic curve E, i.e. whether it is a binary field, a ternary field, or another field and which specific field it is (i.e. $2^{163}$). In another embodiment, the field definition is determined prior to the manufacture of the RFID tag 210, and the tag design is optimized for the field E. Since the tag is a limited processing power device, in one embodiment, the gate layout in the tag itself is optimized to perform the calculations over the preselected field.

The tag saves the tag ID (n) to internal memory. In one embodiment, the tag selects a random number (a) as the private key at this time (420). The random number, a, is of the order of magnitude of E(F). In another embodiment, the private key (a) is generated externally, and sent to the tag. In one embodiment, the private key is sent along with the tag ID (n) by RFID reader 220.

Tag acknowledges the request (430), thereby indicating that the tag identifier has been received, and the private key, a, has been generated. The tag, in one embodiment, stores the private key a in a tamper-resistant internal memory. In one embodiment, the entire tag is tamper resistant. In one embodiment, tamper resistance may, in one embodiment, include logic that erases the memory if the system detects an attempt to read the memory, hack the bus, etc. This may be implemented, in one embodiment, using fuses.

In one embodiment, the RFID reader in turn sends a message, requesting the tag to compute a response for point P, along E(F) (440).

The RFID tag then computes Q=a·P (450) on E(F), and returns the value Q, which is the public key for that tag (460). The feature of elliptical curves over finite fields is that even if P is known, Q is known, and E(F) is known, it is extremely difficult to calculate the value of a (the private key). This is known as the Discrete Log Problem for Elliptic Curves. Similarly, it is believed to be very difficult to calculate a value abP from aP and bP without knowing either a or b. This is known as the Diffie Heiman Problem for Elliptic Curves. In one embodiment, value P is then stored along with the tag identifier. In one embodiment, the value P is identical for all of the tags in a group. This enables the use of the same challenge to be used for the tags in the group, without loss in security. In another embodiment, different values of P may be used for different tags.

The RFID reader then sends the tag identifier (n) along with public key (Q) to a tag signer (470). In one embodiment, tag signer 405 is a certification authority. In one embodiment, tag signer 405 is an RFID-specific certification authority. In one embodiment, tag signer 405 may be a local authority designed to work with RFID reader and manufacturer.

The tag signer digitally signs a document containing the public key Q, tag identifier n, and a time stamp (480). The timestamp, in one embodiment, is used to provide a time limit for the validity of an RFID tag. In one embodiment, after a set time, the RFID tag is no longer considered valid, even if a match is shown. For example, and RFID tag for a medicine may become invalid when the medicine expires. Alternatively, the timestamp may simply be used for uniqueness. In one embodiment, the timestamp may also be correlated with other information to check consistency. For example, it would be very strange if a manufacturer claimed in one document that an item was manufactured in June 2005, but the tag certificate claimed it was manufactured in October 2006.

In one embodiment, the signed document including the certified public key, tag identifier, and time stamp is made available over a certification server. In another embodiment, the document may be stored on a medium, or within the RFID reader. In one embodiment, the document may be stored on a non-volatile memory which is made available along with the goods tagged with the RFID tags. For example, for a purchase of a quantity of medicine, a CD/other non-volatile memory with the RFID tags & public keys may be made available along with the RFID reader. This would enable verification of the authenticity of the drugs even in a remote location which may not have network access. In another embodiment, the document may be stored with the tag itself. This is known as self-validation.

In one embodiment, the generation of the private key is done by the manufacturer. The manufacturer chooses a random value a, of a similar order of magnitude to the order of E. The manufacturer then calculates a value Q=a·P, and publishes Q, the tag's public key, and associated parameters F, E, and P. The manufacturer retains a, the private key, and the associated parameters F, E, P.

Figure 5:
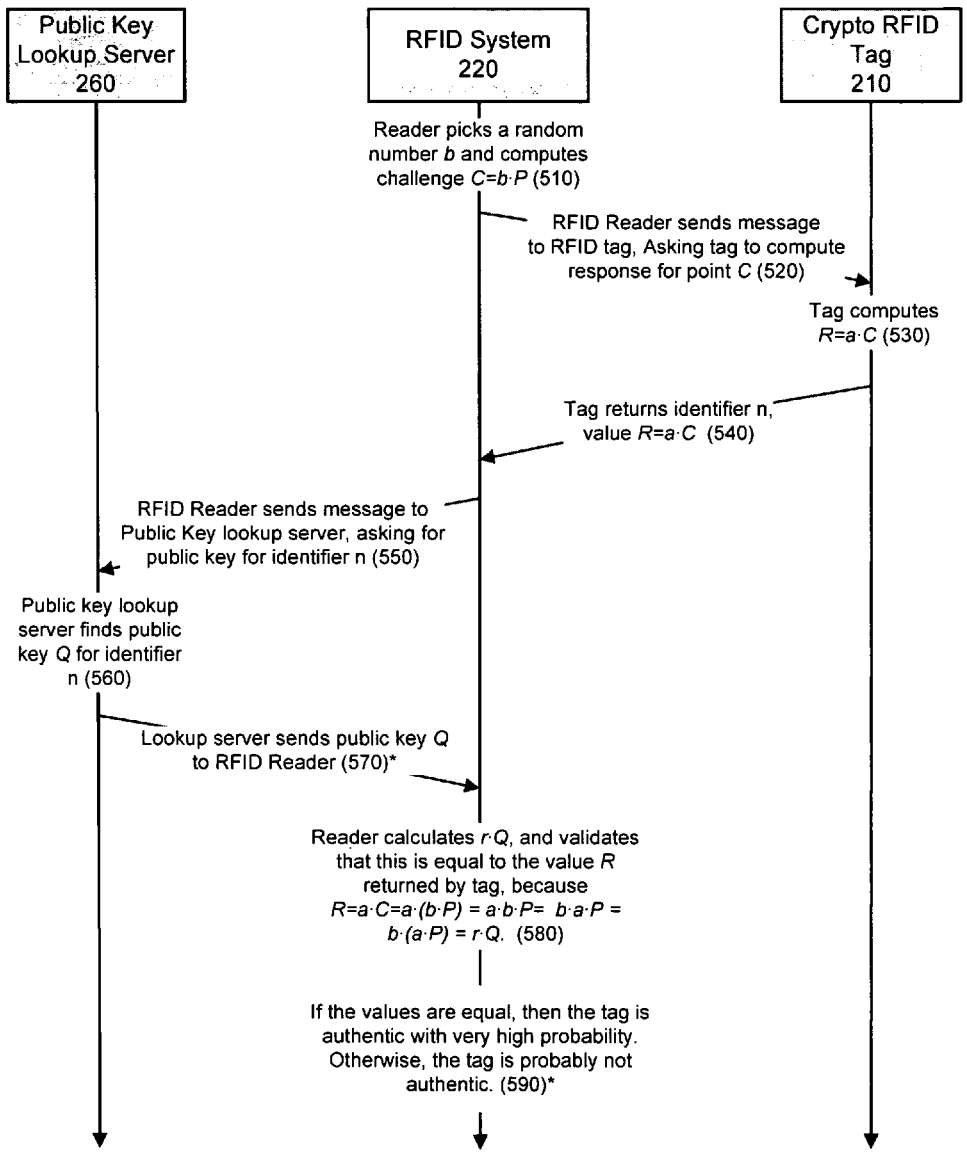
FIG. 5 is a signal flow diagram of one embodiment of reading an RFID tag in accordance with the present invention.

FIG. 5 is a signal flow diagram of one embodiment of reading an RFID tag in accordance with the present invention.

The RFID reader 220 needs the public key for the tag 210, and the tag identifier (n), in order to validate a tag.

As noted above, each RFID tag is uniquely encoded with a 96-bit (or 64-bit) tag identifier, also known as an EPC identifier. The RFID tag sends this information to the reader. This identifier is used to look up the item type using an Object Naming Service (ONS) system. The manufacturer of the product, in one embodiment, makes a document containing a description of the item available (again, as part of the EPC-IS system). In one embodiment, the document is an XML document; however, alternative formats may be used. The manufacturer, in one embodiment, includes a copy of the public key for the tag within the document. The document is also digitally signed to prove that it is authentic.

In order to validate the tag, in one embodiment, the following sequence occurs. The reader chooses a random value b, of a similar order of magnitude to the order of E. The reader then calculates a value C=b·P over the curve (510). The value b is a random value and P is the point P along on E(F) that was used to generate the private key. The value P is known to the reader. In one embodiment, the value P is standardized for tags. In one embodiment, the value P varies by "tag group." For example, in one embodiment, all tags for products of a particular manufacturer may use the same P. This challenge is sent the tag (520). Note that the random numbers, including a and b, should be chosen through a cryptographically strong random number generator. If an adversary can predict a value of b or re-use a value of b, an adversary can query a tag in advance to determine the response R to a challenge C and produce a fake tag based on the expected challenge response pair. In one embodiment, the values of E, F, and P are verified to have the characteristics corresponding to difficult-to-break systems. Such verification processes are known in the art.

The tag receives C, and calculates R=a·C over the curve (530). The tag then sends R back to the reader (540). Along with R, the tag also returns the tag identifier, n.

The RFID reader then uses the tag identifier, n, to look up the public key of the tag (550). The look-up may be directed to a public key look-up server 260, which is remote from the RFID system 220. This remote system may be accessed via wireline connection such as a dial-up, Digital Subscriber network (DSL), cable, or other wired connection. In another embodiment, the remote system may be accessed via a wireless connection, such as WiFi, Bluetooth, WiFiMax, 800-series connection, cellular telephone network connection, etc. In another embodiment, the public key look-up may be in internal memory of the RFID system, in a memory card or other coupled external memory source, or in a locally connected system. In yet another embodiment, the public key may be stored as a digital certificate on the RFID tag [210], and obtained from the RFID tag along with the challenge response. In one embodiment, if the RFID tag includes the certified public key, the RFID tag may not need a tag identifier. In one embodiment, the RFID reader validates the authenticity of the digital certificate before using the public key to validate the response [540] from the tag [210].

The public key look-up server finds the public key, Q, associated with the tag identifier it received from the RFID system (560), and returns the public key to the RFID reader (570). In one embodiment, if the tag identifier look-up fails, the public key server so notifies the RFID reader. In that instance, in one embodiment, the RFID reader resends the challenge. In one embodiment, the challenge is not resent, but rather only the tag identifier is requested from the RFID tag. In one embodiment, if there are multiple successive failures of such a look-up, the RFID reader determines that the RFID tag is non-functional, and the object to which it is attached is deemed to be inauthentic.

Reader calculates b·Q over E(F), and validates that this is equal to the value R returned by tag (580). The two values are equal because $$R = a \cdot C = a \cdot (b \cdot P) = a \cdot b \cdot P = b \cdot a \cdot P = b \cdot (a \cdot P) = b \cdot Q \text{ over } E(F)$$

where:
R is the challenge response sent by the tag in [540];
a is the private key
C is the challenge sent by the reader equal to b·P in E(F)
b is the random number generated in step [510]
P is the point along curve E(F) which was used to calculate the original public key; and
Q is the public key, equal to a·P on E(F).

If the values are equal, then the tag is authentic with very high probability. Otherwise, the tag is probably not authentic. (590). In one embodiment, the RFID reader outputs this information to the user. In one embodiment, an audible or visual warning is provided if inauthentic RFID tags are detected.

In one implementation, the computation in the tags is done using the Koblitz curve $y^2 + xy = x^3 + x^2 + 1$ defined over $F_{2^{163}}$. In one embodiment, the NIST reduction polynomial $f(z) = z^{163} + z^7 + z^6 + z^3 + 1$ is used for binary field operations. As noted above, however, other finite fields such as ternary fields may be used an alternative embodiment.

Figure 6:
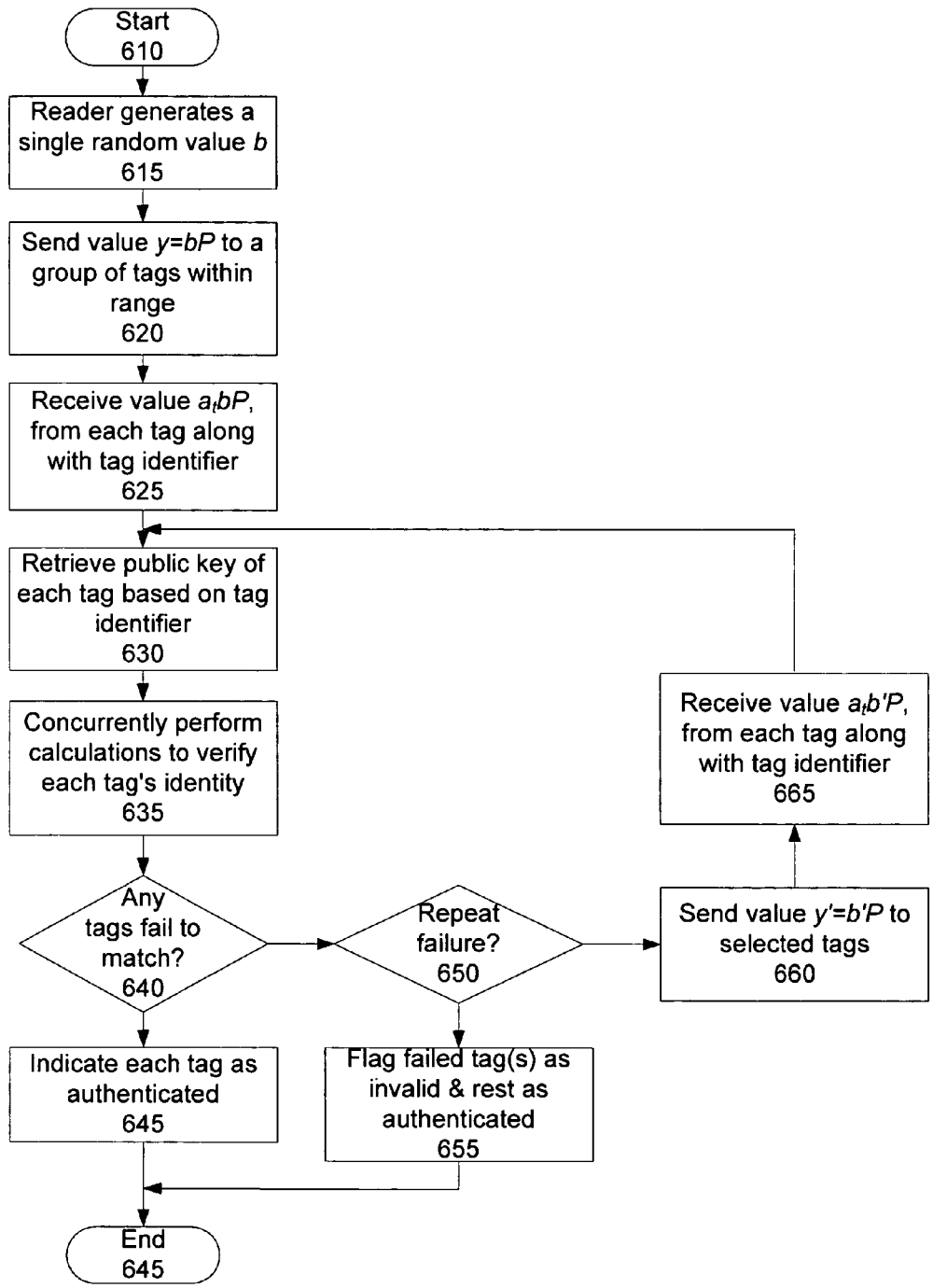
FIG. 6 is a flowchart of one embodiment of reading multiple RFID tags simultaneously.

FIG. 6 is a flowchart of one embodiment of reading multiple RFID tags simultaneously. In many practical contexts, there will be multiple tags (maybe hundreds or thousands) within proximity of a reader. A reader can interrogate tags using a process similar to the process used for class 1 EPC tags. (A similar tree algorithm could be used to capture a group of responses to the authentication algorithm.)

In order to efficiently interrogate multiple tags, a reader will generate a single random value b (615) for a session, and sends the same value y=bB to a group of tags within reach of the reader (620).

Each tag t computes a value $a_t bP$, and responds to the reader with its tag identifier and challenge response (625). In one embodiment, the tag identifier is 96 bits and the response is 163 bits.

For each tag, the reader will query the manufacturer, and retrieve the public key for the tag, based on the tag identifier (630).

The reader then validates the responses received from the tags (635). In one embodiment, the reader uses elliptic curve multiplication algorithms that can multiply several values simultaneously for increased efficiency.

If the tags fail to match, because of failed public key lookup or failure to match the numbers (640), the process determines whether this is a repeat failure (650). In one embodiment, the system may repeat the query a preset number of times to compensate for potential interference between tag responses or dropped bits. If this is not a repeat failure (i.e. the failure number is below the preset number), a new challenge is generated and sent (660). The tags respond with a new response (665). In one embodiment, the repetition is sent only to those tags that failed the initial query. The process then attempts to retrieve the public key of the tag again (635).

If this is a repeat failure (650), the failed tags are identified as invalid, and the rest of the tags are authenticated (655). If no tags failed (at 640), each tag is indicated as authentic, and the process ends.

The LPPS described above can be made sufficiently compactly to use low power RFID tags which should cost less than $0.50/piece. In order to add two values over an elliptic curve, the following registers are used, in one embodiment:
P=(X1:Y1:Z1),
Q=(x2, y2),
T1,
T2,
T3, and
P+Q=(X3:Y3:Z3).

In one embodiment, P is expressed in Jacobean Coordinates and Q in affine coordinates. The use of projective coordinates allows fast point addition with limited computational resources Each register is 163 bits, and there are a total of 11 registers, implying a need for 1793 buffers, plus logic to control data flow. Point doubling requires P=(X1:Y1:Z1), T1, T2, 2P=(X3:Y3:Z3), so no additional registers are needed. Point multiplication for an unknown point can be done using point addition and point doubling. The only additional cost in this computation is the control logic. Some additional storage may be used if Koblitz curves and a TNAF representation of the private key a are used in the computation.

Therefore, a dedicated elliptic curve multiplier for elliptic curves over 163-bit binary fields can be constructed in approximately 652+572+1682+1793+control logic≈7500 logic gates. This can be significantly reduced at some cost in computation time and operational complexity. The methods described above operate very fast by operating on 163 bit numbers. By using general purpose logic to implement some of these primitives, it is possible to reduce the number of gates required to between 2500 and 5000.

Additionally, it should be possible to reduce the size of this implementation by better sharing registers between primitive operations (in particular, for multiplication), and by eliminating some extra buffers. Therefore, the LPPS and associated methods described herein may be implemented on a very small scale, without significantly increasing the cost of the RFID tag or other device.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. An apparatus to authenticate limited processing-power systems (LPPS) using elliptic cryptography within a well known elliptic curve E, over a well known finite field F(E(F)), the apparatus comprising:
    a random number generator to choose a random value b, of a similar order of magnitude to the order of E(F);
    a challenge calculator to calculate a value C=bP, a challenge, and send the challenge to a limited power processing system (LPPS), where P is a point on the elliptic curve E(F) which was used as a basis for generating a private key, a, for the LPPS;
    an RFID reader to receive a challenge response, R=aC=abP from the LPPS;
    a crypto calculator to calculate bQ, based on a public key, Q=aP, of the LPPS; and
    a comparison logic to:
        determine that aC=abP=baP=bQ; and
        authenticate the LPPS based on the determination.

2. The apparatus of claim 1, wherein the random number generator is a cryptographically strong random number generator, which produces non-predictable values of b.

3. The apparatus of claim 1, further comprising:
a look-up logic to look up a public key of the LPPS in a public key database.

4. The apparatus of claim 3, wherein the public key database is available through one or more of the following: a local database accessible through a local computer system, a non-volatile memory which is coupled to the apparatus, and a remote database accessible through a network.

5. The apparatus of claim 4, wherein the network is selected from among the following: a wireless network, a wireline network, and a cellular telephone network.

6. The apparatus of claim 1, wherein a private key based on random number a is stored in the LPPS, and not available outside the LPPS.

7. The apparatus of claim 6, wherein the random number a is stored in tamper resistant memory in the LPPS.

8. The apparatus of claim 6, wherein the private key comprises (F, E, P, a), and the public key comprises (F, E, P, Q), where E is the elliptic curve, F is the finite field, P is a point P∈E(F) that is the "base" for a subgroup of E, and a is a random value.

9. The apparatus of claim 1, wherein the LPPS generates a random number, a, as a private key, wherein the random number a is of the same length as the order of E(F).

10. The apparatus of claim 1, wherein the well known finite field is a binary field.

11. The apparatus of claim 1, wherein the well known finite field is a ternary field.

12. An RFID system for enabling cryptographic verification of an identity of an RFID tag, the RFID system comprising:
a challenge calculator to calculate a challenge, C=bP, where b is a random number, and P is a point on an elliptic curve E(F) which was used as a basis for generating a private key, a, for a limited processing-power system (LPPS);
an RFID reader to receive a challenge response, R, and a tag identifier from the RFID tag;
a look-up logic to look up a public key, Q, associated with the tag identifier;
a crypto calculator to calculate a value of bQ on an elliptic curve over a finite field; and
a comparison logic to:
compare the bQ to the challenge response, R=aC=abP, received from the RFID tag to determine if bQ=R=aC=abP, and
authenticate the RFID tag if it is determined that bQ=R=aC=abP.

13. The RFID system of claim 12, further comprising:
a public key database for storing a public key of the RFID tag.

14. The RFID system of claim 13, wherein the public key database is selected from among the following: a local database, a non-volatile memory coupled to the RFID reader, and a remote database accessible through a network.

15. The RFID system of claim 14, further comprising:
a network connection comprising one or more of the following: a wireless network, a wireline network, and a cellular telephone network.

16. The RFID system of claim 12, wherein the finite field is a binary field.

17. The RFID system of claim 12, wherein the finite field is a ternary field.

18. A method of using public key cryptography for authentication of a limited processing-power system (LPPS) using elliptic cryptography within a well known elliptic curve E, over a well known finite field F (E(F)), the method comprising:
generating a private key, a, for the LPPS;
requesting the LPPS to generate a public key, Q, by multiplying an originating point P with the LPPS's private key, a;
requesting a digital certificate for the public key;
generating a random number, b, and requesting the LPPS to calculate abP, in response to challenge bP;
calculating a value of bQ;
comparing abP to bQ, to determine whether bQ=abP; and
authenticating the LPPS if it is determined that bQ=abP.

19. The method of claim 18, wherein the LPPS generates the private key, a.

20. The method of claim 18, further comprising looking up the public key of the LPPS in a public key database.

21. The method of claim 20, wherein the public key database is selected from among the following: a local database, a non-volatile memory coupled to the RFID reader, and a remote database accessible through a network.

22. The method of claim 18, wherein the well known finite field is a binary field.

23. The method of claim 18, wherein the well known finite field is a ternary field.

* * * * *